(12) United States Patent
Desjardins

(10) Patent No.: US 10,318,109 B2
(45) Date of Patent: Jun. 11, 2019

(54) EMOJI SUGGESTER AND ADAPTED USER INTERFACE

(71) Applicant: Microsoft Technology Licensing, LLC, Redmond, WA (US)

(72) Inventor: Patrick Desjardins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/618,439

(22) Filed: Jun. 9, 2017

(65) Prior Publication Data

US 2018/0356957 A1 Dec. 13, 2018

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 9/451* (2018.02);
(Continued)

(58) Field of Classification Search
None
See application file for complete search history.

(56) References Cited

U.S. PATENT DOCUMENTS

| 6,493,006 B1 | 12/2002 | Gourdol et al. |
| 6,687,876 B1 | 2/2004 | Schilit et al. |

(Continued)

FOREIGN PATENT DOCUMENTS

| WO | 2007080570 A1 | 7/2007 |
| WO | 2015119605 A1 | 8/2015 |
| WO | 2016035097 A2 | 3/2016 |

OTHER PUBLICATIONS

"Can't decide between a smiley face and a thumbs up? SwiftKey app suggests the perfect emoji for messages as you type", http://www.dailymail.co.uk/sciencetech/article-3597468/Can-t-decide-smiley-face-thumbs-SwiftKey-app-suggests-perfect-emoji-messages-type.html, Published on: May 18 2016, 6 pages.

(Continued)

*Primary Examiner* — Thanh T Vu
(74) *Attorney, Agent, or Firm* — Schwegman Lundberg & Woessner, P.A.

(57) ABSTRACT

Non-limiting examples of the present disclosure describe an enhanced user interface that improves user interaction for suggestion and placement of emojis in a communication such as a message thread. An emoji, for insertion within a message thread, is selected through a user interface of an application. A plurality of selectable user interface features may be presented through the user interface, where the plurality of selectable user interface features are usable for insert of the selected emoji at different positions within the message thread. The plurality of selectable user interface features may be presented based on an analysis of the context of a message thread including signal data associated with the message thread. A selection may be received of one of the plurality of selectable user interface features. The emoji may be inserted into the message thread at a position that corresponds with the selection of a user interface feature.

20 Claims, 6 Drawing Sheets

(51) Int. Cl.
*H04L 12/58* (2006.01)
*G06F 3/0482* (2013.01)
*G06F 17/27* (2006.01)
*G06F 9/451* (2018.01)
*H04M 1/725* (2006.01)

(52) U.S. Cl.
CPC ........ *G06F 17/276* (2013.01); *G06F 17/2765* (2013.01); *H04L 51/04* (2013.01); *H04L 51/10* (2013.01); *G06F 17/2785* (2013.01); *H04M 1/72552* (2013.01)

(56) References Cited

U.S. PATENT DOCUMENTS

| | | |
|---|---|---|
| 7,036,077 B2 | 4/2006 | Saund et al. |
| 7,185,280 B2 | 2/2007 | Deganello et al. |
| 7,237,202 B2 | 6/2007 | Gage |
| 7,259,752 B1 | 8/2007 | Simmons |
| 7,324,691 B2 | 1/2008 | Li et al. |
| 7,373,590 B2 | 5/2008 | Woolf et al. |
| 7,581,194 B2 | 8/2009 | Iwema et al. |
| 7,748,634 B1 | 7/2010 | Zehr et al. |
| 8,014,607 B2 | 9/2011 | Saund et al. |
| 8,116,570 B2 | 2/2012 | Vukosavljevic et al. |
| 8,250,463 B2 | 8/2012 | Bargeron et al. |
| 8,290,478 B2 | 10/2012 | Shim et al. |
| 8,347,206 B2 | 1/2013 | Gear et al. |
| 8,429,568 B2 | 4/2013 | Davidson |
| 8,451,238 B2 | 5/2013 | Kim et al. |
| 8,464,167 B2 | 6/2013 | Saund et al. |
| 8,464,175 B2 | 6/2013 | Turcan et al. |
| 9,015,610 B2 | 4/2015 | Hunter |
| 9,075,522 B2 | 7/2015 | Hinckley et al. |
| 9,292,171 B2 | 3/2016 | Li et al. |
| 9,298,855 B2 | 3/2016 | Aggarwal et al. |
| 9,400,570 B2 | 7/2016 | Chang |
| 2003/0011643 A1* | 1/2003 | Nishihata ............ G06F 3/04817 715/810 |
| 2005/0156873 A1 | 7/2005 | Walter et al. |
| 2006/0224952 A1 | 10/2006 | Lin |
| 2006/0267967 A1 | 11/2006 | Hinckley et al. |
| 2007/0079260 A1 | 4/2007 | Bhogal et al. |
| 2007/0180377 A1 | 8/2007 | Gittelman et al. |
| 2008/0232690 A1 | 9/2008 | Saund et al. |
| 2008/0238887 A1 | 10/2008 | Love |
| 2010/0171754 A1 | 7/2010 | Hatfield et al. |
| 2010/0318916 A1 | 12/2010 | Wilkins |
| 2011/0102314 A1 | 5/2011 | Roux |
| 2011/0187662 A1 | 8/2011 | Lee et al. |
| 2011/0209057 A1 | 8/2011 | Hinckley et al. |
| 2011/0267353 A1 | 11/2011 | Johansson |
| 2012/0066581 A1 | 3/2012 | Spalink |
| 2012/0096345 A1 | 4/2012 | Ho et al. |
| 2012/0113019 A1 | 5/2012 | Anderson |
| 2012/0162115 A1 | 6/2012 | Lim |
| 2012/0176416 A1 | 7/2012 | Dondurur et al. |
| 2012/0221659 A1 | 8/2012 | Brown et al. |
| 2013/0073998 A1 | 3/2013 | Migos et al. |
| 2013/0159919 A1 | 6/2013 | Leydon |
| 2013/0239049 A1 | 9/2013 | Perrodin et al. |
| 2014/0033027 A1 | 1/2014 | Polo et al. |
| 2014/0092130 A1* | 4/2014 | Anderson ............ G06F 3/011 345/632 |
| 2014/0204014 A1 | 7/2014 | Thorn |
| 2014/0215341 A1 | 7/2014 | Fratti et al. |
| 2015/0095020 A1* | 4/2015 | Leydon ............ G06F 3/0236 704/9 |
| 2015/0100537 A1* | 4/2015 | Grieves ............ G06N 5/048 706/52 |
| 2015/0145800 A1 | 5/2015 | Fukui |
| 2015/0286371 A1* | 10/2015 | Degani ............ G06F 17/274 705/14.64 |
| 2016/0004301 A1 | 1/2016 | Stachniak et al. |
| 2016/0048318 A1 | 2/2016 | Markiewicz |
| 2016/0378291 A1 | 12/2016 | Pokrzywka |

OTHER PUBLICATIONS

Calimlim, Aldrin, "6 emoji keyboard apps for iOS to help you", https://appadvice.com/appnn/2015/07/6-emoji-keyboard-apps-for-ios-to-help-you-say-more, Published on: Jul. 17, 2015, 15 pages.
Snelgrove, Xavier, "Teaching Robots to Feel: Emoji & Deep Learning", https://web.archive.org/web/20160925074851/http://getdango.com:80/emoji-and-deep-learning/, Published on: Sep. 25, 2016, 12 pages.
"Anchored objects", Retrieved from https://helpx.adobe.com/indesign/using/anchored-objects.html, Mar. 17, 2017, 19 Pages.
"Arrange, Resize, Rotate, and Align", Retrieved from https://web.archive.org/web/20170625230254/http://www.pixelmator.com/ios/user-guide/arrange.php, Retrieved on: May 15, 2017, 5 Pages.
"Displaying Contextual Tabs", Retrieved from https://docs.microsoft.com/en-us/windows/desktop/windowsribbon/ribbon-contextualtabs, Jan. 10, 2012, 4 Pages.
"Exari DocGen", Retrieved from https://web.archive.org/web/20170316222955/https://www.exari.com/contract-management-products-and-solutions/document-assembly, Mar. 12, 2017, 8 Pages.
"Smart Notebook Training", Retrieved from http://northweststate.edu/wp-content/uploads/files/nb11_beginner.pdf, Retrieved on: May 10, 2017, 69 Pages.
"Smartlife Push Journal", Retrieved from http://www.smartlifepushjournal.com/, Retrieved on: May 09, 2017, 18 Pages.
Chen, et al., "Navigation Techniques for Dual-Display E-Book Readers", In Proceedings of the SIGCHI Conference on Human Factors in Computing Systems, Apr. 5, 2008, 10 Pages.
Da, "People and Object Tracking for Video Annotation", In Doctoral dissertation of Faculty of Science and Technology, Sep. 2012, 102 Pages.
Golovchinsky, et al., "Moving Markup: Repositioning Freeform Annotations", In Proceedings of the 15th annual ACM Symposium on User Interface Software and Technology, Oct. 27, 2002, 9 Pages.
Hinckley, et al., "Pen +Touch= New Tools", In Proceedings of 23rd Annual ACM Symposium on User Interface Software and Technology, Oct. 3, 2010, pp. 27-36.
Houser, Casey, "Google Awarded Patent for Dual-Page Ebook Reader", Retrieved from https://web.archive.org/web/20160411171523/https://www.gazelle.com/thehorn/2014/02/11/google-awarded-patent-for-dual-page-ebook-reader/, Feb. 11, 2014, 5 Pages.
Li, Yu, "Dedicated E-reading Devices: the State of the Art and the Challenges", In Journal of Design of Electronic Text, vol. 1, Issue 1, Aug. 5, 2008, 7 Pages.
Miclaus, et al., "Semantic Web Based Context-Adaptable Generation of Product Specific Documentation", In Proceedings of the 5th International Workshop on Web of Things, Oct. 8, 2014, 6 Pages.
Moran, et al., "Pen-Based Interaction Techniques for Organizing Material on an Electronic Whiteboard", In Proceedings of the 10th Annual ACM Symposium on User Interface Software and Technology, Oct. 1, 1997, 10 Pages.
Nielsen, Jakob, "Utilize Available Screen Space", Retrieved from https://www.nngroup.com/articles/utilize-available-screen-space/, May 9, 2011, 5 Pages.
Ostermann, Stefan, "ScribMaster for Android", Retrieved from https://www.scribmaster.com/en/;jsessionid=77A63AA57E38885641E53B78F78E1BFC, Jan. 2012, 3 Pages.
"International Search Report and Written Opinion Issued in PCT Application No. PCT/US2018/027411", dated Jun. 19, 2018, 11 Pages.
"International Search Report & Written Opinion Issued in PCT Application No. PCT/US2018/031928", dated Aug. 24, 2018, 14 Pages.

* cited by examiner

EMOJI SUGGESTER AND ADAPTED USER INTERFACE

BACKGROUND

Emojis provide a small digital image or icon used to express an idea, emotion, etc., in electronic communication. Emojis are Unicode not easily accessible for customers to select without having additional add-on services. In many cases, functionality for inserting an emoji into a conversation is limited to a few specific exemplary icons, which may not be truly related to the context that is present in that conversation. For instance, a user may type the word "bug" into a conversation about a software update and receive an emoji for an insect such as a ladybug rather than a software-related emoji.

In current emoji services, a user may be able to select an emoji icon to replace a word in a conversation. However, placement for an emoji is fixed where the emoji can only replace a specific word in a conversation. Furthermore, if a user wishes to insert multiple emojis into a conversation, the user has to take manual action to replace each word with a specific emoji.

As such, non-limiting examples of the present disclosure pertain to an enhanced user interface that improves user interaction when a user is working with emojis.

SUMMARY

Non-limiting examples of the present disclosure describe an enhanced user interface that improves user interaction for suggestion and placement of emojis in a communication such as a message thread, call/video communication, email, text message, etc. A context of a message thread including signal data associated with one or more users of the message thread may be analyzed. In at least one example, emoji suggestions for insertion into the message thread may be ranked and filtered for presentation within a user interface of an application based on the analysis of the message thread. An emoji, for insertion within a message thread, is selected through a user interface of an application. A plurality of selectable user interface features may be presented through the user interface, where the plurality of selectable user interface features are usable for insert of the selected emoji at different positions within the message thread. As an example, the plurality of selectable user interface features are presented based on an analysis of the context of the message thread and an analysis of the user signal data. A selection may be received of one of the plurality of selectable user interface features. The emoji may be inserted into the message thread at a position that corresponds with the selection of the one of the plurality of selectable user interface features. Further related examples are also described below in the detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
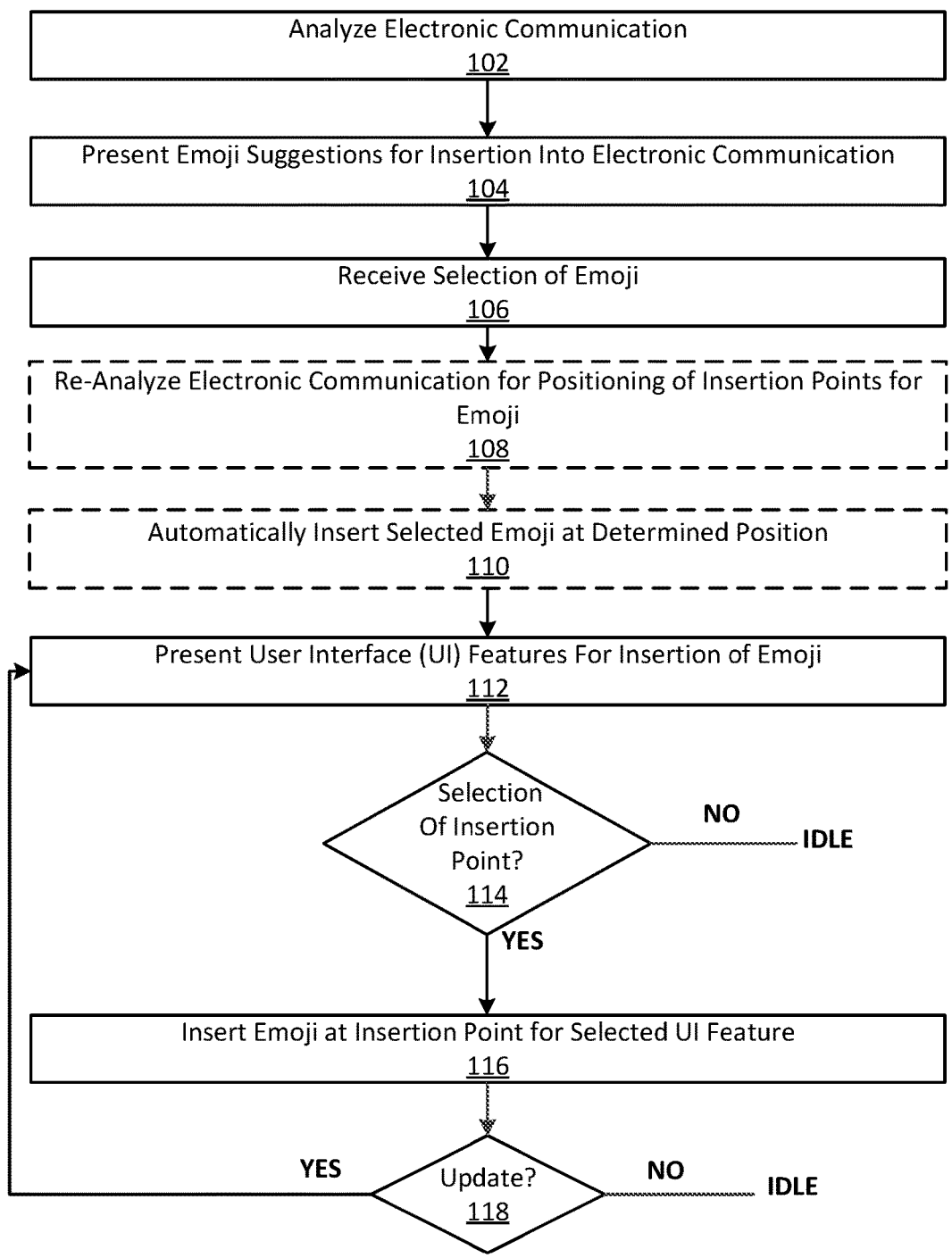
FIG. 1 illustrates an exemplary method related to suggestive placement of an emoji within a communication with which aspects of the present disclosure may be practiced.

Non-limiting examples of the present disclosure describe an enhanced user interface that improves user interaction for suggestion and placement of emojis in a communication such as a message thread, call/video communication, email, text message, etc., In other non-limiting examples, context associated with an exemplary communication (e.g. message thread) may be analyzed and used to provide emoji suggestions as well as provide suggested placement positions for insertion of an emoji within the communication. Context of a communication may comprise but is not limited to: content within the communication, a state of the communication (e.g. current state for response/reply), telemetric analysis associated with the communication, users associated with the communication and signal data (e.g. user signal data, device signal data, application signal data, etc.) associated with the communication, users and/or devices associated with the communication, among other examples. For example, results from contextual analysis of a message thread may be utilized to rank and filter emojis as suggestions for replacing content (e.g. word/words) within a message thread. Additionally, signal data associated with a communication (e.g. message thread), user/users, device, etc. may further be analyzed to improve ranking and filtering of emojis, for example, where emojis can be presented that are personalized for the context of a message that the user is working with. In further examples, results of contextual analysis (including analysis of signal data) of a message thread may be utilized to determine placement positions for insertion of an emoji in a message thread. For instance, placement positions for inserting an emoji into a message thread can be ranked, filtered and presented (e.g. highest N number of predicted positions for placement) to a user through a user interface. In at least one example, a position for insertion of an emoji may be determined based on a result of the contextual analysis, where the emoji may be automatically inserted at that determined position. In further instances, additional suggestions for placement of the emoji may be provided through a user interface of an application where selectable user interface (UI) features may be presented to a user to quickly and efficiently place an emoji at a desired position within a message thread.

Moreover, in additional non-limiting examples, content of a communication may be scanned where specific portions of content can be replaced with emojis on behalf of a user. As an example, a long message may be written out, where an exemplary application/service is configured to scan the message content, analyze the message content and replace some of the words with emojis to shorten (and liven up) the message. Contextual analysis of a communication as well as learning modeling (e.g. based on signal data associated with past actions from a user or plurality of users) can be utilized to improve processing, for example, to predict which words a user may want to replace and how to re-configure the message content on behalf of the user. Suggestions and notifications for a automatic replacement of content with an emoji on behalf of a user may be presented through a user interface of an application.

Accordingly, the present disclosure provides a plurality of technical advantages including but not limited to: an improved user interface for presentation and placement of emojis in an application/service, ability to generate message drafts that comprise emoji content on behalf of a user, more efficient operation of processing devices (e.g., saving computing cycles/computing resources) for presentation and placement of emojis, improving user interaction with exemplary application/services and extensibility to access and integrate data from different applications/services of a distributed network to improve application processing, among other examples.

FIG. 1 illustrates an exemplary method 100 related to suggestive placement of an emoji within a communication with which aspects of the present disclosure may be practiced. Method 100 describes examples relations to generation and management of an exemplary real-time visualization providing context data within an application/service. For ease of understanding, examples described herein relate to an application/service that is configured as a collaborative team environment. While examples described herein reference a collaborative team environment, it is to be understood that processing operations and user interface examples described herein can extend to any type of application/service that provides message threads which include multiple users.

Figure 3:
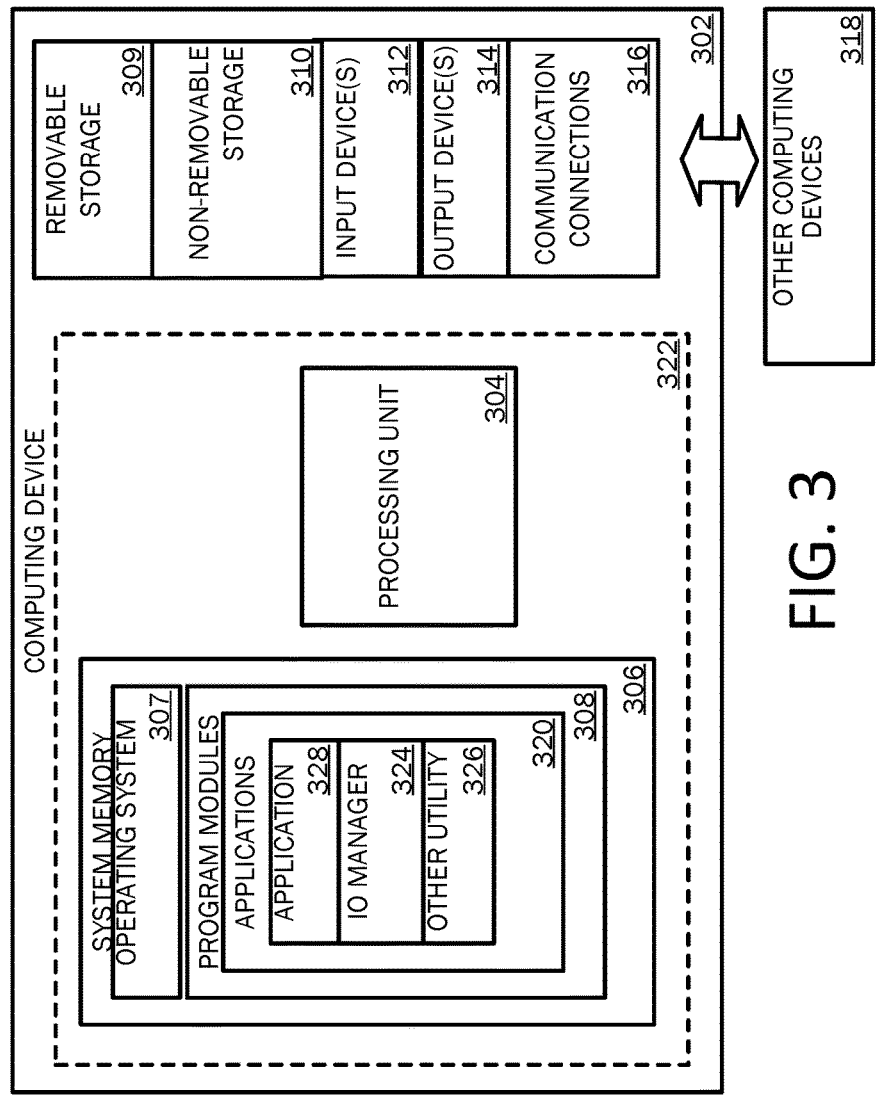
FIG. 3 is a block diagram illustrating an example of a computing device with which aspects of the present disclosure may be practiced.
Figure 4A:
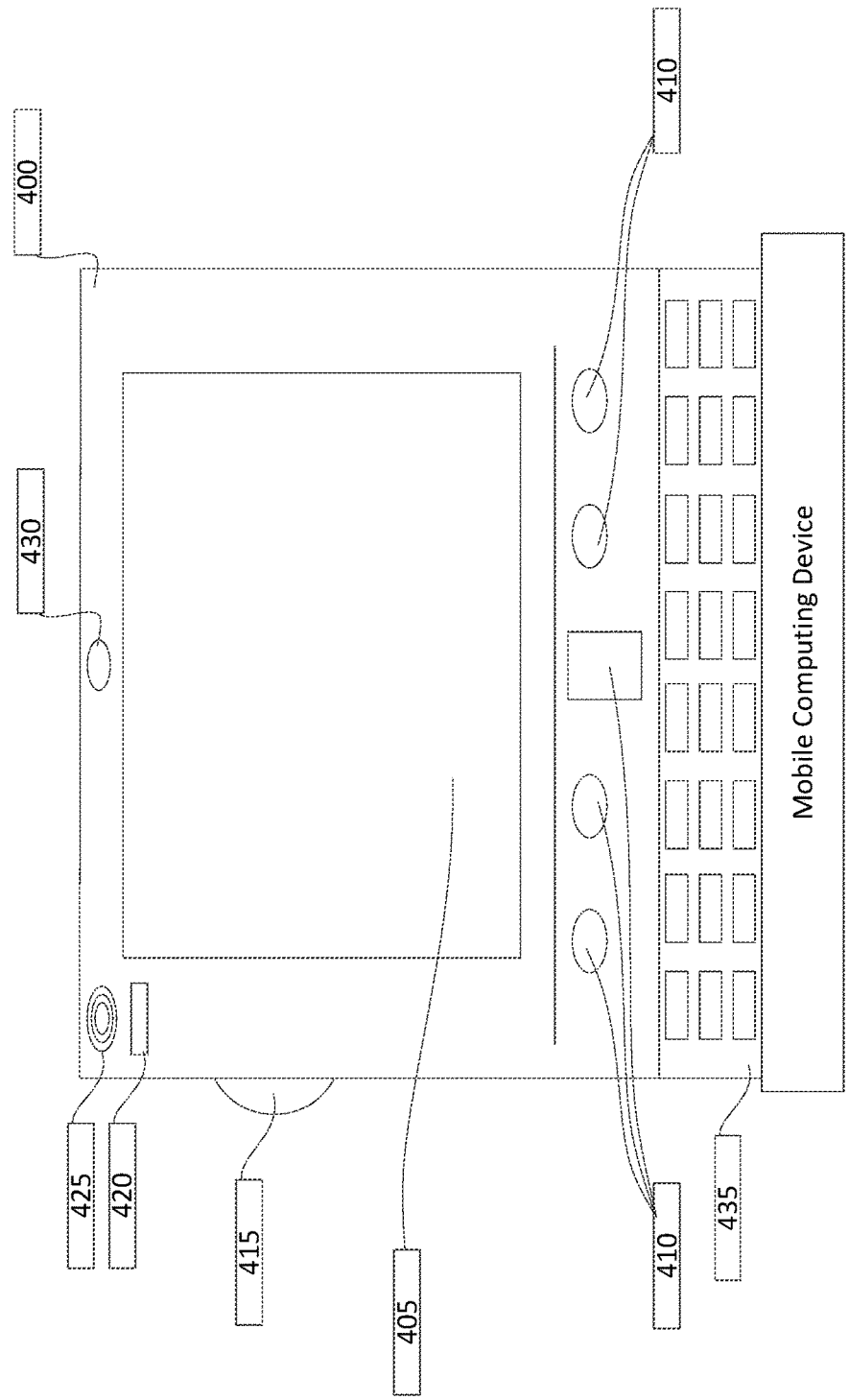
FIGS. 4A and 4B are simplified block diagrams of a mobile computing device with which aspects of the present disclosure may be practiced.
Figure 4B:
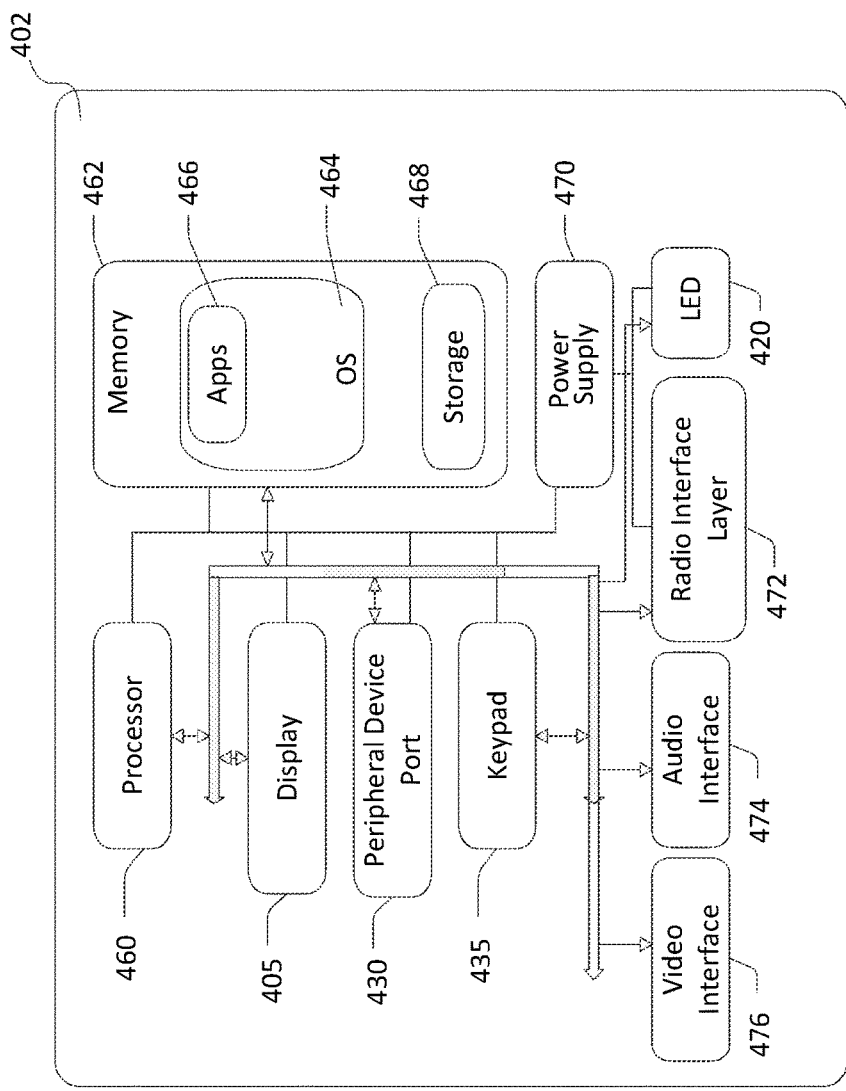
Figure 5:
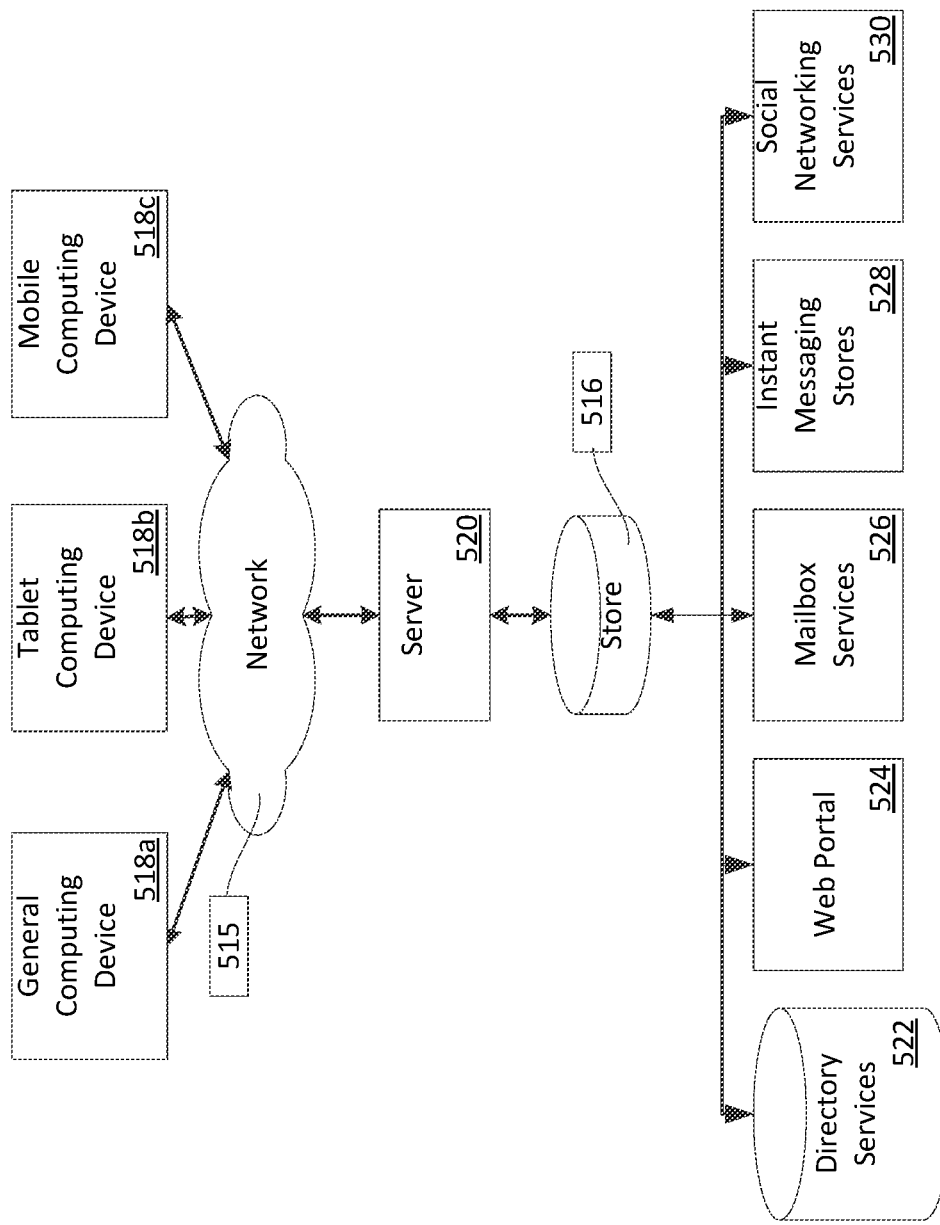
FIG. 5 is a simplified block diagram of a distributed computing system in which aspects of the present disclosure may be practiced.

As an example, method 100 may be executed by an exemplary processing device and/or system such as those shown in FIGS. 3-5. In examples, method 100 may execute on a device comprising at least one processor configured to store and execute operations, programs or instructions. Operations performed in method 100 may correspond to operations executed by a system and/or service that execute computer programs, application programming interfaces (APIs), neural networks or machine-learning processing, among other examples. As an example, processing operations executed in method 100 may be performed by one or more hardware components. In another example, processing operations executed in method 100 may be performed by one or more software components. In some examples, processing operations described in method 100 may be executed by one or more applications/services associated with a web service that has access to a plurality of application/services, devices, knowledge resources, etc. Processing operations described in method 100 may be implemented by one or more components connected over a distributed network, where an exemplary collaborative team environment may be a distributed service accessed via network connection.

Method 100 begins at processing operation 102, where an exemplary communication of an application is analyzed. As an example, a communication may be an electronic communication in any form and may be received through any of a plurality of modalities. Examples of modalities include but are not limited to: message threads, call/video communications, emails, text messages, social networking services, productivity applications (e.g. web browsing applications, spreadsheet applications, word processing applications, notes applications, presentation applications,) etc. An exemplary application/service is a messaging application (e.g. SMS messaging, email, etc.) or any application that provides input, for example, where a user can enter input into an input field such as a message thread, web search service, etc. A message thread is a sequence of one or more responses that may include one or more users. In one example, an exemplary application/service is a collaborative team environment that enables users to communicate collaboratively in teams/groups, for example, on a project by project basis. A collaborative team environment is a team-based groupware solution that helps people work together collectively while located remotely from each other. Collaborative team environments enable real time collaboration synchronously as well as asynchronously. As an example, collaborative team environments can be configured to include functionality such as: multimodal communication, sharing of data including electronic calendars, collective writing messages and communication in message threads, e-mail handling, shared database access, and management of electronic meetings where each person is able to see and display information for others, among other examples. An exemplary collaborative team environment may further be extensible to interface with other applications/services including social networking services and other applications/services associated with a platform (e.g. Microsoft® Office 365® that may provide a suite of applications).

As referenced above, an exemplary communication evaluated in processing operation 102 may be a message thread of an application service. Analysis (processing operation 102) of a message thread may comprise executing contextual analysis of aspects associated with the message thread. For example, processing operation 102 may comprise processing operations that evaluate context associated with an exemplary communication (e.g. message thread), which may be used to provide emoji suggestions as well as provide suggested placement positions for insertion of an emoji within the communication. Context of a communication may comprise but is not limited to: content within the communication, a state of the communication (e.g. current state for response/reply), telemetry analysis associated with the communication, users associated with the communication and signal data (e.g. user signal data, device signal data, application signal data, etc.) associated with the communication, users and/or devices associated with the communication, among other examples. For example, results from contextual analysis of a message thread may be utilized to rank and filter emojis as suggestions for replacing content (e.g. word/words) within a message thread. In further example, results of contextual analysis of a message thread may be utilized to determine placement positions for insertion of an emoji in a message thread.

As an example, context of a message thread that may be analyzed (processing operation 102) comprises applying input understanding processing to evaluate different aspects of a message/message thread. Contextual analysis of a communication as well as learning modeling (e.g. based on signal data associated with past actions from a user or plurality of users) can be utilized to improve processing, for example, to predict which words a user may want to replace and how to re-configure the message content on behalf of the user. Analysis of context of a message input may comprise applying one or more input understanding models in coordination with knowledge repositories and/or knowledge graphs to evaluate semantic understanding, subject/entities, etc. In one example, input understanding processing for contextual analysis of a message input may be further executed by a web search engine service (e.g. Bing®) and/or an intelligent personal assistant service (e.g. Cortana®). Models, knowledge repositories and associated components for analysis of message input and input understanding processing are known to one skilled in the art. In analyzing a message input, components may be applied to determine intent and/or interests of the user. Processing operations for determining intent and user interests are known to one skilled in the art. Components used for analyzing message input may be incorporated within an exemplary application/service or alternative an application/service may be extended to connect with other applications/services in a distributed networking example. For instance, a message/message thread (and associated signal data) may be transmitted to other components or applications/services to execute analysis of a message, for example, where results are returned to enhance an exemplary user interface that may provide emojis and suggested or predictive placement for selected emojis.

Contextual analysis of a message thread (or multiple threads) may comprise evaluating a state of the message thread as well as message data of the message thread. Input understanding models may be utilized to analyze as current state of a message thread, for example, to determine a specific word (or words, sentence, etc.) that is currently being entered as and provide a context for entry of that word. This may be useful data to assist with ranking and filtering of emojis that are to be presented to a user. In further examples, contextual evaluation comprises evaluating an entirety of message data of a message thread. Message data may comprise previous message data may be correspondence in any form including but not limited to: emails, text messages, chat or conferencing communications, file data (including video and/or audio files), among other examples. For instance, previous message data may be associated with a second user (or multiple other users of a message thread) where the previous message data comprises message data from correspondence between the first user and the second user across one or more message threads. Such data may be further used to rank and filter emojis for selection as well as provide suggestive placement options for inserting an emoji into a message thread.

In analyzing (processing operation 102) an exemplary communication, collected signal data may also be evaluated. Signal data may comprise data collected from any of: user devices, user accounts, specific applications/services, etc. Such data may be useful to provide a personalization of suggestions for a user. For instance, a user may prefer certain emojis for specific words or prefer to place certain emojis in specific position within a message thread. Telemetric analysis may be executed on collected signal data and used for assisting with processing determinations. In at least one example, collected signal data may be utilized in a weighted model that may be utilized for making a determination for ranking/filtering emojis or predictive placement of emojis within a message thread. User signal data may comprise any data relating to actions (explicit or implicit) that are taken by a user, user preferences, settings, etc., which may be evaluated to determine intent and/or interests of the user. In another instance, signal data from a device (e.g. device type, locational data, application usage, etc.) may be used to further assist with making processing determinations. In further examples, signal data from a suite of productivity services or other applications/services affiliated with a platform (e.g. Microsoft®, Apple®, Google®, etc.) may be collected and analyzed to assist with making processing determinations. For instance, a user may have a platform user account where cross-application usage of the user (or other users) can be utilized to assist with making processing determinations.

Flow may proceed to processing operation 104, where emoji suggestions are presented for insertion in a communication. Processing operation 104 may comprise presenting one or more emoji suggestions for insertion into a message thread, for example, to replace a specific word in the message thread. Contextual analysis of a communication (e.g. message thread), as executed in processing operation 102, may be used to determine emojis to present to a user through a user interface of an application. In at least one example, emoji suggestions for insertion into the message thread may be ranked and filtered for presentation within a user interface of an application based on the analysis of the message thread. A highest number (N) ranked emojis may be output for display through a user interface of an exemplary application/service. For instance, a user interface may be configured to provide an array of emojis that are associated with specific words, which may be suggested for insertion into a message thread. As an example, the array of emojis may pre-defined with basic words and images association, but can be configured by the user to add new words as well as new emojis. In other examples, emojis may be retrieved from other applications/services (e.g. first, second or third-party services), where contextual analysis may be used to rank and filter emojis for presentation.

In processing operation 104, an exemplary emoji suggester may be utilized to present emojis for selection within a user interface of an application/service. An exemplary emoji suggester may be incorporated within an exemplary application/service or may be a separate application/service that interfaces with an executing application/service. An emoji suggester is a graphical element, for example, that may be presented above (below, on the side, etc.) of the input box when the control is single line or presented above (below, on the side, etc.) the line of text in a multi-text input (text area). The emoji suggester may be single-lined with the height a of single emoji/position icon. Different aspects of the emoji suggester may vary based on developer and/or user configurations.

The emoji suggester may contain an array of words stored in a hash table (hash map) for each word, where words may be mapped to specific emojis. This enables faster association between words and possible emoji to suggest, which improves processing efficiency and user interaction. An exemplary hash key for the hash table may vary by developer specifications. In one example, a hash is set for words in the plural form or the verb in the conjugated form. Furthermore, the emoji suggester is configured to handle different verb tenses as well as singular and pluralization of words. The emoji suggester may further be configured to work with different letter case, identify emojis despite misspellings, etc.

Further, processing operations related to presenting emojis may be optimized and continuously updated over time. For example, synonyms of words may not present an emoji twice but the emoji suggester may be configured to point to the original hash entry. For example, emojis for "assignment" may have 5 emojis where emojis for "task" may have very similar suggestions. Instead of repeating the 5 emojis for results related to tasks, results for a search of "task" may point to the 5 emojis for a search of "assignment." Not only does this preserve memory space but it also allows for changes to emojis without having to repeat the modification on multiple keywords. As identified above, contextual analysis of words may also adjust what emojis are suggested for specific words, which may ultimately lead to some variation in emoji suggestions for similar words such as "assignment" and "task".

In one example of processing operation 104, user interface features for emoji suggestion (e.g. through the emoji suggester) are configured to automatically open/display if a word matches the pre-defined words and images collection associated with the array of emojis. The emoji suggester may appear when the user begins typing. If the user wants to use an emoji, this one needs to press the "up" key to select the emoji. If the user hit "enter" the emoji is selected, the position choices is displayed. The user can select a position with the left and right arrow (like for emoji). Once the choice is done, by pressing "enter" the emoji suggester closes and the emoji is inserted. In further examples, user interface features for the emoji suggester are touch and/or voice enabled, among other alternative forms of input that are known to one skilled in the art. In alternate examples, an exemplary user interface is configured to enable a user to manually access a listing of emojis, where user interface features may be presented to enable users to search specific emojis. For instance, a user interface (UI) feature for quick display of emoji suggestions may be accessible through the UI of an exemplary application/service.

Flow may proceed to processing operation 106, where a selection of an emoji (from the listing of presented emojis) may be received and processed. Selection (processing operation 106) may be received through any form of input that is associated with a computing device as known to one skilled in the art where an exemplary application/service is configured to work with the various forms of input. A selection of an emoji may comprise receiving input of a selection of one or more of the ranked and filtered emojis presented to the user through the user interface.

In some alternative examples of method 100, flow may proceed to processing operation 108, where further analysis of a communication occurs, for example, based on a user selection of an emoji. An exemplary communication (e.g. message thread) may be analyzed to determine different insertion points within a communication for placement of a selected emoji. As previously described (in processing operation 102), contextual analysis of a communication for placement of an emoji may occur have already occurred. In some instances, additional signal data collected (e.g. selection of specific emoji) may be considered in determining optimal placement positions within a communication, where signal data collected in real-time to update ranking and filtering for presenting insertion points for a selected emoji. In such instances, processing operation 108 may comprise re-analyzing context of a communication for determining positioning of insertion points for a selected emoji. Whether analysis of placement positions for insertion of an emoji happens before selection of an emoji (or after), placement positions for inserting an emoji into a message thread can be ranked, filtered and presented (e.g. highest N number of predicted positions for placement) to a user through a user interface. In one example, two or more different UI features for insertion points of a selected emoji are generated and simultaneously presented to the user for selection.

In further alternative examples of method 100, flow may proceed to processing operation 110, where a selected emoji may be automatically inserted at a determined position within a communication such as a message thread. For instance, a selected emoji may be automatically inserted at a determined position based on the analysis of the context of the message thread and/or the analysis of the signal data (e.g. user signal data). In one example, an emoji can be predictively placed in the most appropriate location with the option to quickly move it another location through the UI based on additional UI features presented for the user through the UI. That is, in examples where an emoji is automatically inserted at a specific position, additional UI features for re-positioning of the emoji may be automatically displayed for the user. This may enable efficient re-positioning of an inserted emoji without the user having to take multiple steps (e.g. click, select, drag, drop, etc.) to re-position the emoji.

In any example, flow may proceed to processing operation 112, where UI features for insertion of a selected emoji are presented through the UI of the application/service. Processing operation 112 may comprise presenting one or more of the plurality of selectable user interface features for positioning a selected emoji for insertion or re-positioning of the automatically inserted emoji (in examples processing operation 110). A plurality of selectable UI features may be presented through the user interface, where the plurality of selectable UI features are usable for insert of the selected emoji at different positions within the communication. The plurality of selectable UI features provide placement positions for insertion of the emoji at two or more selected from a non-limiting group: at a beginning of a text input field, before a specific word in the message thread, after the specific word in the message thread, as a replacement for the specific word and at an end of the text input field, at the top of a communication, in a signature of a communication, in a header/footer of a communication, as a comment/note, etc. UI features for specific insertion points may be distinguished from other parts of the communication, for example, through, color, alerts, formatting, etc. In one example, multiple UI features for insertion are presented through the UI where the UI features overlay an exemplary communication. Additional UI features may be presented for control and management of the UI features for insertion.

Flow may proceed to decision operation 114, where it is determined whether a selection is received for a UI insertion point. If no selection is received, flow of method 100 branches NO and processing remains idle. In some examples, a specific amount of idle time may result in removing the UI insertion points from display. In examples where a selection of a UI insertion point is received, flow of method 100 branches YES and processing proceeds to processing operation 116. At processing operation 116, the selected emoji is inserted into a communication at a position that corresponds with the selected UI feature for insertion.

Flow may proceed to decision operation 118, where it is determined whether there is an update to be made to the positioning of the selected emoji. If no input is received for update, flow of method 100 branches NO and processing remains idle. If an update is to occur to the positioning of the selected emoji, flow branches YES and processing returns to processing operation 112. At processing operation 112, UI features for re-positioning of the emoji within the communication may be presented to the user.

For efficiency, the word input entered, the emoji selection and the choice of position is saved for the user. The user's selection is saved in the local storage or over a distributed storage (e.g. of a distributed application/service. This way, when the user type the word again, instead of selecting the first emoji and first kind of position, the invention select the previous selected emoji and position. This may be an instance where an emoji can be automatically inserted at a specific position, for example, based on contextual analysis described above. In some instance, shortcuts can be set for quicker insertion of emojis at specific positions. For instance, a user could simply click "up"+"enter"+"enter" to have the exact behavior chosen from past instances of emoji insertion. The choice of being locally is mainly to have good performance when the user is typing. However, to reach a higher level of performance, that storage is loaded in memory once the system that use the invention is initialized. Such data may be saved back to the local storage once the user is making a new selection or modify an existing choice for an word-emoji or word-emoji-position.

Figure 2:
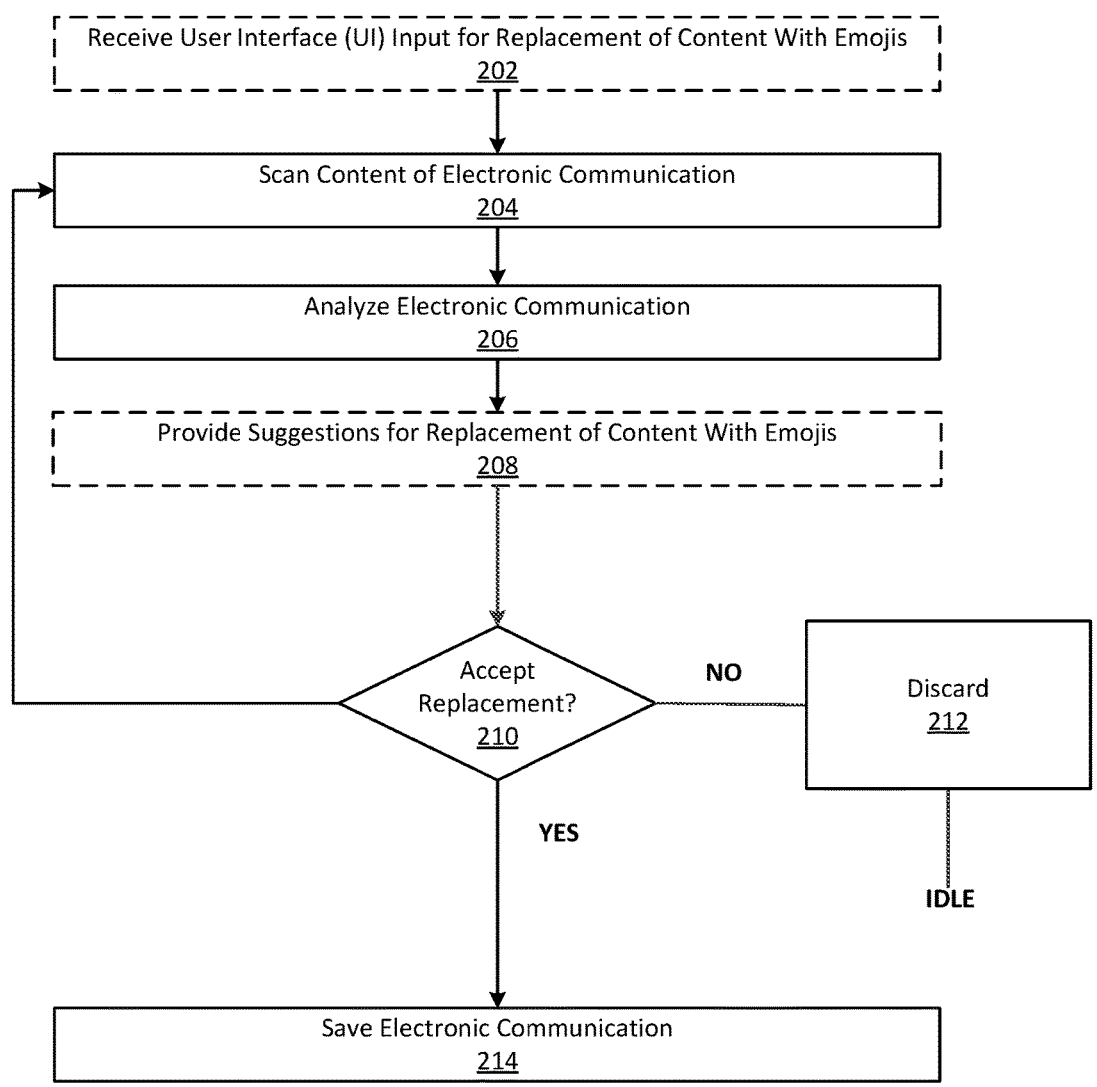
FIG. 2 illustrates an exemplary method related to scanning for and replacing content with emojis on behalf of a user with which aspects of the present disclosure may be practiced.

FIG. 2 illustrates an exemplary method 200 related to scanning for and replacing content with emojis on behalf of a user with which aspects of the present disclosure may be practiced. As an example, method 200 may be executed by an exemplary processing device and/or system such as those shown in FIGS. 3-5. In examples, method 200 may execute on a device comprising at least one processor configured to store and execute operations, programs or instructions. Operations performed in method 200 may correspond to operations executed by a system and/or service that execute computer programs, application programming interfaces (APIs), neural networks or machine-learning processing, among other examples. As an example, processing operations executed in method 200 may be performed by one or more hardware components. In another example, processing operations executed in method 200 may be performed by one or more software components. In some examples, processing operations described in method 200 may be executed by one or more applications/services associated with a web service that has access to a plurality of application/services, devices, knowledge resources, etc. Processing operations described in method 200 may be implemented by one or more components connected over a distributed network, where an exemplary collaborative team environment may be a distributed service accessed via network connection.

Method 200 begins at processing operation 202, where a UI input for emoji insertion may be received. For example, a UI feature may be selectable that, when selected, causes an application/service to initiate scanning of a communication (or multiple communications) to replace content with emojis. Examples of communications (e.g. electronic communications) have been provided in the foregoing. In other examples of method 200, scanning (processing operation 204) of content of a communication may occur automatically, where an exemplary application/service is configured to proactively scan content on behalf of a user. In such cases, a notification may be provided to a user that indicates that content can be replaced with emojis, for example, to short (and liven up) a communication.

Flow may proceed to processing operation 204, where content of a communication is scanned for inserting emojis to replace one or more portions of content. As reference above, content of a communication may be scanned where specific portions of content can be replaced with emojis on behalf of a user. In examples, scanning may occur on one or more portions of a communication such as an input field, a message or entire message threads. As an example, a long message may be written out, where an exemplary application/service is configured to scan the message content, analyze the message content and replace some of the words with emojis to shorten (and liven up) the message. Flow may proceed to processing operation 206, where the communication is analyzed. Contextual analysis of a communication as well as learning modeling (e.g. based on signal data associated with past actions from a user or plurality of users) can be utilized to improve processing, for example, to predict which words a user may want to replace and how to re-configure the message content on behalf of the user. For instance, contextual analysis may yield a determination that the user may prefer to replace some words with emojis but not others. Other aspects of analysis (processing operation 206) may be rule-based, for example, to limit the number of emojis used to replace a word, sentence, paragraph, etc., which may improve user satisfaction.

Method 200 may proceed to processing operation 208, where suggestions for replacing content with emojis may be presented to a user. Suggestions for replacing content with emojis may occur on an individual basis (e.g. word or string of input) or for a communication (e.g. message thread) as a whole. For instance, a draft of message with replacement emojis may be provided to a user for review. A user may be presented an option to accept replacement of content with emojis, for example, some or all of the suggested modifications. In alternative examples, notifications may be provided (through the user interface) indicating that suggestions are available for replacing a portion of content with an emoji on behalf of the user.

In any example, flow may proceed to decision operation 210, where it is determined whether the user accepts replacement of one or more content portions with emojis. In some instances, a UI may provide a preview of changed content for the user. If the user does not accept a change, flow of method 200 branches NO and flow proceeds to processing operation 212, where a change is discarded. If the user does accept a change, flow of method 200 branches YES and flow proceeds to processing operation 214, where changes to the communication are saved for the user.

FIGS. 3-5 and the associated descriptions provide a discussion of a variety of operating environments in which examples of the invention may be practiced. However, the devices and systems illustrated and discussed with respect to FIGS. 3-5 are for purposes of example and illustration and are not limiting of a vast number of computing device configurations that may be utilized for practicing examples of the invention, described herein.

FIG. 3 is a block diagram illustrating physical components of a computing device 302, for example a mobile processing device, with which examples of the present disclosure may be practiced. Among other examples, computing device 302 may be an exemplary computing device configured for to work with an enhanced user interface that improves user interaction for suggestion and placement of emojis in an exemplary communication as described herein. In a basic configuration, the computing device 302 may include at least one processing unit 304 and a system memory 306. Depending on the configuration and type of computing device, the system memory 306 may comprise, but is not limited to, volatile storage (e.g., random access memory), non-volatile storage (e.g., read-only memory), flash memory, or any combination of such memories. The system memory 306 may include an operating system 307 and one or more program modules 308 suitable for running software programs/modules 320 such as IO manager 324, other utility 326 and application 328. As examples, system memory 306 may store instructions for execution. Other examples of system memory 306 may store data associated with applications. The operating system 307, for example, may be suitable for controlling the operation of the computing device 302. Furthermore, examples of the invention may be practiced in conjunction with a graphics library, other operating systems, or any other application program and is not limited to any particular application or system. This basic configuration is illustrated in FIG. 3 by those components within a dashed line 322. The computing device 302 may have additional features or functionality. For example, the computing device 302 may also include additional data storage devices (removable and/or non-removable) such as, for example, magnetic disks, optical disks, or tape. Such additional storage is illustrated in FIG. 3 by a removable storage device 309 and a non-removable storage device 310.

As stated above, a number of program modules and data files may be stored in the system memory 306. While executing on the processing unit 304, program modules 308 (e.g., Input/Output (I/O) manager 324, other utility 326 and application 328) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 3 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 402 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 302 may also have one or more input device(s) 312 such as a keyboard, a mouse, a pen, a sound input device, a device for voice input/recognition, a touch input device, etc. The output device(s) 314 such as a display, speakers, a printer, etc. may also be included. The aforementioned devices are examples and others may be used. The computing device 302 may include one or more communication connections 316 allowing communications with other computing devices 318. Examples of suitable communication connections 316 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 306, the removable storage device 309, and the non-removable storage device 310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 302. Any such computer storage media may be part of the computing device 302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 4A and 4B illustrate a mobile computing device 400, for example, a mobile telephone, a smart phone, a personal data assistant, a tablet personal computer, a phablet, a slate, a laptop computer, and the like, with which examples of the invention may be practiced. Mobile computing device 400 may be an exemplary computing device configured to work with an enhanced user interface that improves user interaction for suggestion and placement of emojis in an exemplary communication as described herein. Application command control may be provided for applications executing on a computing device such as mobile computing device 400. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 4A, one example of a mobile computing device 400 for implementing the examples is illustrated. In a basic configuration, the mobile computing device 400 is a handheld computer having both input elements and output elements. The mobile computing device 400 typically includes a display 405 and one or more input buttons 410 that allow the user to enter information into the mobile computing device 400. The display 405 of the mobile computing device 400 may also function as an input device (e.g., touch screen display). If included, an optional side input element 415 allows further user input. The side input element 415 may be a rotary switch, a button, or any other type of manual input element. In alternative examples, mobile computing device 400 may incorporate more or less input elements. For example, the display 405 may not be a touch screen in some examples. In yet another alternative example, the mobile computing device 400 is a portable phone system, such as a cellular phone. The mobile computing device 400 may also include an optional keypad 435. Optional keypad 435 may be a physical keypad or a "soft" keypad generated on the touch screen display or any other soft input panel (SIP). In various examples, the output elements include the display 405 for showing a GUI, a visual indicator 420 (e.g., a light emitting diode), and/or an audio transducer 425 (e.g., a speaker). In some examples, the mobile computing device 400 incorporates a vibration transducer for providing the user with tactile feedback. In yet another example, the mobile computing device 400 incorporates input and/or output ports, such as an audio input (e.g., a microphone jack), an audio output (e.g., a headphone jack), and a video output (e.g., a HDMI port) for sending signals to or receiving signals from an external device.

FIG. 4B is a block diagram illustrating the architecture of one example of a mobile computing device. That is, the mobile computing device 400 can incorporate a system (i.e., an architecture) 402 to implement some examples. In one examples, the system 402 is implemented as a "smart phone" capable of running one or more applications (e.g., browser, e-mail, calendaring, contact managers, messaging clients, games, and media clients/players). In some examples, the system 402 is integrated as a computing device, such as an integrated personal digital assistant (PDA), tablet and wireless phone.

One or more application programs 466 may be loaded into the memory 462 and run on or in association with the operating system 464. Examples of the application programs include phone dialer programs, e-mail programs, personal information management (PIM) programs, word processing programs, spreadsheet programs, Internet browser programs, messaging programs, and so forth. The system 402 also includes a non-volatile storage area 468 within the memory 462. The non-volatile storage area 468 may be used to store persistent information that should not be lost if the system 402 is powered down. The application programs 466 may use and store information in the non-volatile storage area 468, such as e-mail or other messages used by an e-mail application, and the like. A synchronization application (not shown) also resides on the system 402 and is programmed to interact with a corresponding synchronization application resident on a host computer to keep the information stored in the non-volatile storage area 468 synchronized with corresponding information stored at the host computer. As should be appreciated, other applications may be loaded into the memory 462 and run on the mobile computing device (e.g. system 402) described herein.

The system 402 has a power supply 470, which may be implemented as one or more batteries. The power supply 470 might further include an external power source, such as an AC adapter or a powered docking cradle that supplements or recharges the batteries.

The system 402 may include peripheral device port 430 that performs the function of facilitating connectivity between system 402 and one or more peripheral devices. Transmissions to and from the peripheral device port 430 are conducted under control of the operating system (OS) 464. In other words, communications received by the peripheral device port 430 may be disseminated to the application programs 466 via the operating system 464, and vice versa.

The system 402 may also include a radio interface layer 472 that performs the function of transmitting and receiving radio frequency communications. The radio interface layer 472 facilitates wireless connectivity between the system 402 and the "outside world," via a communications carrier or service provider. Transmissions to and from the radio interface layer 472 are conducted under control of the operating system 464. In other words, communications received by the radio interface layer 472 may be disseminated to the application programs 566 via the operating system 464, and vice versa.

The visual indicator 420 may be used to provide visual notifications, and/or an audio interface 474 may be used for producing audible notifications via the audio transducer 425 (as described in the description of mobile computing device 400). In the illustrated example, the visual indicator 420 is a light emitting diode (LED) and the audio transducer 425 is a speaker. These devices may be directly coupled to the power supply 470 so that when activated, they remain on for a duration dictated by the notification mechanism even though the processor 460 and other components might shut down for conserving battery power. The LED may be programmed to remain on indefinitely until the user takes action to indicate the powered-on status of the device. The audio interface 474 is used to provide audible signals to and receive audible signals from the user. For example, in addition to being coupled to the audio transducer 425 (shown in FIG. 4A), the audio interface 474 may also be coupled to a microphone to receive audible input, such as to facilitate a telephone conversation. In accordance with examples of the present invention, the microphone may also serve as an audio sensor to facilitate control of notifications, as will be described below. The system 402 may further include a video interface 476 that enables an operation of an on-board camera 430 to record still images, video stream, and the like.

A mobile computing device 400 implementing the system 402 may have additional features or functionality. For example, the mobile computing device 400 may also include additional data storage devices (removable and/or non-removable) such as, magnetic disks, optical disks, or tape. Such additional storage is illustrated in FIG. 4B by the non-volatile storage area 468.

Data/information generated or captured by the mobile computing device 400 and stored via the system 402 may be stored locally on the mobile computing device 400, as described above, or the data may be stored on any number of storage media that may be accessed by the device via the radio 472 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 472 or via a distributed computing network. Similarly, such data/information may be readily transferred between computing devices for storage and use according to well-known data/information transfer and storage means, including electronic mail and collaborative data/information sharing systems.

FIG. 5 illustrates one example of the architecture of a system for providing an application that reliably accesses target data on a storage system and handles communication failures to one or more client devices, as described above. The system of FIG. 5 may be an exemplary system configured to work with an enhanced user interface that improves user interaction for suggestion and placement of emojis in an exemplary communication as described herein. Target data accessed, interacted with, or edited in association with programming modules 308 and/or applications 320 and storage/memory (described in FIG. 3) may be stored in different communication channels or other storage types. For example, various documents may be stored using a directory service 522, a web portal 524, a mailbox service 526, an instant messaging store 528, or a social networking site 530, IO manager 324, other utility 326, application 328 and storage systems may use any of these types of systems or the like for enabling data utilization, as described herein. A server 520 may provide storage system for use by a client operating on general computing device 302 and mobile device(s) 400 through network 515. By way of example, network 515 may comprise the Internet or any other type of local or wide area network, and a client node may be implemented for connecting to network 515. Examples of a client node comprise but are not limited to: a computing device 302 embodied in a personal computer, a tablet computing device, and/or by a mobile computing device 400 (e.g., mobile processing device). As an example, a client node may connect to the network 515 using a wireless network connection (e.g. WiFi connection, Bluetooth, etc.). However, examples described herein may also extend to connecting to network 515 via a hardwire connection. Any of these examples of the client computing device 302 or 400 may obtain content from the store 516.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
   analyzing a context of a message thread and user signal data associated with one or more users of the message thread;
   receiving, through a user interface of an application, a selection of an emoji to insert within the message thread;
   presenting, through the user interface, a plurality of selectable user interface features for insert of the selected emoji at different positions within the message thread, wherein the presenting presents the plurality of selectable user interface features based on an analysis of the context of the message thread and an analysis of the user signal data;
   receiving, through the user interface, a selection of one of the plurality of selectable user interface features; and
   inserting the emoji at a position within the message thread that corresponds with the selection of the one of the plurality of selectable user interface features.

2. The method of claim 1, wherein the plurality of selectable user interface features provide placement positions for insertion of the emoji at two or more selected from a group consisting of: at a beginning of a text input field, before a specific word in the message thread, after the specific word in the message thread, as a replacement for the specific word and at an end of the text input field.

3. The method of claim 1, further comprising: filtering and ranking emoji suggestions for insertion into the message thread based on the analysis of the context of the message thread and the analysis of the user signal data, and presenting the filtered and ranked emoji suggestions through the user interface of the application.

4. The method of claim 1, further comprising: automatically inserting the emoji at a determined position based on the analysis of the context of the message thread and the analysis of the user signal data, wherein the presenting presents one or more of the plurality of selectable user interface features for re-positioning of the automatically inserted emoji.

5. The method of claim 1, further comprising: selecting, through the user interface, the inserted emoji within the message thread; and re-presenting the plurality of selectable user interface features for re-positions of the inserted emoji.

6. The method of claim 5, further comprising: receiving another selection of the plurality of selectable user interface features; and re-positioning the inserted emoji based on the another selection of the plurality of selectable user interface features.

7. The method of claim 1, further comprising: scanning the message thread for content that is replaceable with emojis; analyzing the content of the message thread based on a contextual analysis of the message thread; and providing suggestions for replacement of one or more portions of content with emojis based on the contextual analysis of the message thread.

8. A system comprising:
   at least one processor; and
   a memory, operatively connected with the at least one processor, storing computer-executable instructions that, when executed by the at least one processor, causes the at least one processor to execute a method that comprises:
   analyzing a context of a message thread and user signal data associated with one or more users of the message thread;
   receiving, through a user interface of an application, a selection of an emoji to insert within the message thread;
   presenting, through the user interface, a plurality of selectable user interface features for insert of the selected emoji at different positions within the message thread, wherein the presenting presents the plurality of selectable user interface features based on an analysis of the context of the message thread and an analysis of the user signal data;
   receiving, through the user interface, a selection of one of the plurality of selectable user interface features; and
   inserting the emoji at a position within the message thread that corresponds with the selection of the one of the plurality of selectable user interface features.

9. The system of claim 8, wherein the plurality of selectable user interface features provide placement positions for insertion of the emoji at two or more selected from a group consisting of: at a beginning of a text input field, before a specific word in the message thread, after the specific word in the message thread, as a replacement for the specific word and at an end of the text input field.

10. The system of claim 8, wherein the method, executed by the at least one processor, further comprises: filtering and ranking emoji suggestions for insertion into the message thread based on the analysis of the context of the message thread and the analysis of the user signal data, and presenting the filtered and ranked emoji suggestions through the user interface of the application.

11. The system of claim 8, wherein the method, executed by the at least one processor, further comprises: automatically inserting the emoji at a determined position based on the analysis of the context of the message thread and the analysis of the user signal data, wherein the presenting presents one or more of the plurality of selectable user interface features for re-positioning of the automatically inserted emoji.

12. The system of claim 8, wherein the method, executed by the at least one processor, further comprises: selecting, through the user interface, the inserted emoji within the message thread; and re-presenting the plurality of selectable user interface features for re-positions of the inserted emoji.

13. The system of claim 12, wherein the method, executed by the at least one processor, further comprises: receiving another selection of the plurality of selectable user interface features; and re-positioning the inserted emoji based on the another selection of the plurality of selectable user interface features.

14. The system of claim 8, wherein the method, executed by the at least one processor, further comprises: scanning the message thread for content that is replaceable with emojis; analyzing the content of the message thread based on a contextual analysis of the message thread; and providing suggestions for replacement of one or more portions of content with emojis based on the contextual analysis of the message thread.

15. A computer-readable medium storing computer-executable instructions that, when executed by at least one processor, causes the at least one processor to execute a method comprising:
 analyzing a context of a message thread and user signal data associated with one or more users of the message thread;
 receiving, through a user interface of an application, a selection of an emoji to insert within the message thread;
 presenting, through the user interface, a plurality of selectable user interface features for insert of the selected emoji at different positions within the message thread, wherein the presenting presents the plurality of selectable user interface features based on an analysis of the context of the message thread and an analysis of the user signal data;
 receiving, through the user interface, a selection of one of the plurality of selectable user interface features; and
 inserting the emoji at a position within the message thread that corresponds with the selection of the one of the plurality of selectable user interface features.

16. The computer-readable medium of claim 15, wherein the plurality of selectable user interface features provide placement positions for insertion of the emoji at two or more selected from a group consisting of: at a beginning of a text input field, before a specific word in the message thread, after the specific word in the message thread, as a replacement for the specific word and at an end of the text input field.

17. The computer-readable medium of claim 15, wherein the method further comprising: filtering and ranking emoji suggestions for insertion into the message thread based on the analysis of the context of the message thread and the analysis of the user signal data, and presenting the filtered and ranked emoji suggestions through the user interface of the application.

18. The computer-readable medium of claim 15, wherein the method further comprising: automatically inserting the emoji at a determined position based on the analysis of the context of the message thread and the analysis of the user signal data, wherein the presenting presents one or more of the plurality of selectable user interface features for re-positioning of the automatically inserted emoji.

19. The computer-readable medium of claim 15, wherein the method further comprising: selecting, through the user interface, the inserted emoji within the message thread; and re-presenting the plurality of selectable user interface features for re-positions of the inserted emoji.

20. The computer-readable medium of claim 15, wherein the method further comprising: scanning the message thread for content that is replaceable with emojis; analyzing the content of the message thread based on a contextual analysis of the message thread; and providing suggestions for replacement of one or more portions of content with emojis based on the contextual analysis of the message thread.

\* \* \* \* \*